United States Patent
Ajmera et al.

(10) Patent No.: US 11,360,831 B2
(45) Date of Patent: Jun. 14, 2022

(54) EFFICIENT MECHANISM FOR EXECUTING SOFTWARE-BASED SWITCHING PROGRAMS ON HETEROGENOUS MULTICORE PROCESSORS

(71) Applicant: Telefonaktiebolaget LM Ericsson (publ), Stockholm (SE)

(72) Inventors: Vishal Deep Ajmera, Bangalore (IN); Nitin Katiyar, Bangalore (IN); Keshav Gupta, Bangalore (IN); Anju Thomas, Bangalore (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/294,619

(22) PCT Filed: Dec. 24, 2018

(86) PCT No.: PCT/IN2018/050872
§ 371 (c)(1),
(2) Date: May 17, 2021

(87) PCT Pub. No.: WO2020/136659
PCT Pub. Date: Jul. 2, 2020

(65) Prior Publication Data
US 2022/0012108 A1    Jan. 13, 2022

(51) Int. Cl.
*G06F 9/54* (2006.01)
*G06F 9/48* (2006.01)

(52) U.S. Cl.
CPC .............. *G06F 9/542* (2013.01); *G06F 9/485* (2013.01)

(58) Field of Classification Search
CPC ........ G06F 1/26; G06F 1/3203; G06F 1/3215; G06F 9/4843; G06F 9/52; Y02B 60/1217
(Continued)

(56) References Cited

U.S. PATENT DOCUMENTS

| 7,996,839 | B2 | 8/2011 | Farkas et al. |
| 8,683,243 | B2 | 3/2014 | Wu et al. |

(Continued)

OTHER PUBLICATIONS

Becchi et al., "Dynamic Thread Assignment on Heterogeneous Multiprocessor Architectures," Journal of Instruction-Level Parallelism, vol. 10, Jun. 2008, pp. 1-26.
(Continued)

*Primary Examiner* — Andy Ho
(74) *Attorney, Agent, or Firm* — Nicholson, De Vos, Webster & Elliott, LLP

(57) ABSTRACT

A method is implemented by a network device for orchestrating execution of a polling thread of a software-based switching program on a heterogeneous multicore processor. The method includes causing the polling thread to be executed on a first processing core in a first cluster of a plurality of clusters of processing cores, determining a value indicative of a number of active processing cycles used by the polling thread, determining whether the value is higher than a high threshold associated with the first processing core or lower than a low threshold associated with the first processing core, and if so causing the polling thread to be moved to a second processing core in a second cluster of the plurality of clusters, where the second processing core has a different processing capacity than the first processing core.

18 Claims, 7 Drawing Sheets

(58) Field of Classification Search
USPC .......................... 718/100; 713/300, 320, 323
See application file for complete search history.

(56) References Cited

U.S. PATENT DOCUMENTS

| | | | |
|---|---|---|---|
| 9,569,264 B2 * | 2/2017 | Garg | ........................ G06F 9/466 |
| 2012/0297216 A1 * | 11/2012 | Olszewski | ............ G06F 1/3206 |
| | | | 713/320 |
| 2018/0241655 A1 | 8/2018 | Tsirkin | |

OTHER PUBLICATIONS

Birhanu et al., "Efficient Thread Mapping for Heterogeneous Multicore IoT Systems," Hindawi, Mobile Information Systems, vol. 2017, Article ID 3021565, Feb. 27, 2017, pp. 1-8.
International Search Report and Written Opinion, PCT App. No. PCT/IN2018/050872, dated Apr. 5, 2019, 9 pages.
Arm: "ARM Cortex ™—A Series Programmer's Guide v7", Programmer's Guide, Jan. 1, 2013 (Jan. 1, 2013), pp. 1-421.
European Search Report and Search Opinion, EP App. No. 18945149.5, dated Dec. 6, 2021, 10 pages.

* cited by examiner

EFFICIENT MECHANISM FOR EXECUTING SOFTWARE-BASED SWITCHING PROGRAMS ON HETEROGENOUS MULTICORE PROCESSORS

CROSS-REFERENCE TO RELATED APPLICATIONS

This application is a national stage of International Application No. PCT/IN2018/050872, filed Dec. 24, 2018, which is hereby incorporated by reference.

TECHNICAL FIELD

Embodiments of the invention relate to the field of computer networks, and more specifically to efficient execution of software-based switching programs on heterogeneous multicore processors.

BACKGROUND ART

Software-based switches are becoming increasingly deployed due to the emergence of network function virtualization. A software-based switch may be implemented by executing a software-based switching program on general-purpose computing hardware (e.g., which may include a multicore processor). High performance switching programs typically use a polling-based mechanism instead of an interrupt-based mechanism for reading packets from the network interface controller (NIC) input queues. A software-based switching program typically includes multiple polling threads that continuously poll for packets from the input queues. When a packet is available in an input queue, a polling thread reads the packet from the input queue, processes the packet for forwarding (e.g., parses the packet, performs actions on the packet such as pushing/popping a Virtual Local Area Network (VLAN) header and modifying the source Media Access Control (MAC) address, and performs lookup in forwarding tables), and eventually places the processed packet into an output queue for transmission. Due to continuous polling, the polling thread keeps the processing core it is executing on completely busy even when the input queues are empty.

Software-based switching programs have traditionally been executed on homogeneous multicore processors, where all of the processing cores have the same processing capacity (e.g., same frequency rating). Typically, homogeneous multicore processors have the ability to automatically vary the frequency of each processing core based on its usage. When the load is high, the processing cores run at the maximum rated frequency.

The use of heterogeneous multicore processors is becoming increasingly popular. A heterogenous multicore processor typically includes multiple clusters of processing cores, where processing cores in different clusters have different processing capacities (e.g., frequency ratings). For example, a heterogenous processor may include two clusters, where one cluster includes high performance processing cores and the other cluster includes low performance processing cores (e.g., which run at a lower frequency and consume less power compared to the high performance processing cores). However, software-based switching programs are not optimized to be executed on heterogeneous multicore processors and thus may not utilize such processors in an efficient manner.

SUMMARY

A method implemented by a network device for orchestrating execution of a polling thread of a software-based switching program on a heterogeneous multicore processor, where the heterogeneous multicore processor includes a plurality of clusters of processing cores, where processing cores in the same cluster of the plurality of clusters have the same processing capacity, and where processing cores in different clusters of the plurality of clusters have different processing capacities. The method includes causing the polling thread to be executed on a first processing core in a first cluster of the plurality of clusters, determining a value indicative of a number of active processing cycles used by the polling thread, determining whether the value is higher than a high threshold associated with the first processing core or lower than a low threshold associated with the first processing core, and causing the polling thread to be moved to a second processing core in a second cluster of the plurality of clusters in response to a determination that the value is greater than the high threshold associated with the first processing core or lower than the low threshold associated with the first processing core, where the second processing core has a different processing capacity than the first processing core.

A network device for orchestrating execution of a polling thread of a software-based switching program on a heterogeneous multicore processor, where the heterogeneous multicore processor includes a plurality of clusters of processing cores, where processing cores in the same cluster of the plurality of clusters have the same processing capacity, and where processing cores in different clusters of the plurality of clusters have different processing capacities. The network device includes a set of one or more processors and a non-transitory computer-readable storage medium storing instructions, which when executed by the set of one or more processors, causes the network device to cause the polling thread to be executed on a first processing core in a first cluster of the plurality of clusters, determine a value indicative of a number of active processing cycles used by the polling thread, determine whether the value is higher than a high threshold associated with the first processing core or lower than a low threshold associated with the first processing core, and cause the polling thread to be moved to a second processing core in a second cluster of the plurality of clusters in response to a determination that the value is greater than the high threshold associated with the first processing core or lower than the low threshold associated with the first processing core, where the second processing core has a different processing capacity than the first processing core.

A non-transitory computer-readable storage medium storing instructions (e.g., computer code), which when executed by one or more processors of a network device, cause the network device to perform operations for orchestrating execution of a polling thread of a software-based switching program on a heterogeneous multicore processor, where the heterogeneous multicore processor includes a plurality of clusters of processing cores, where processing cores in the same cluster of the plurality of clusters have the same processing capacity, and where processing cores in different clusters of the plurality of clusters have different processing capacities. The operations include causing the polling thread to be executed on a first processing core in a first cluster of the plurality of clusters, determining a value indicative of a number of active processing cycles used by the polling thread, determining whether the value is higher than a high threshold associated with the first processing core or lower than a low threshold associated with the first processing core, and causing the polling thread to be moved to a second processing core in a second cluster of the plurality of clusters in response to a determination that the value is greater than the high threshold associated with the first processing core or lower than the low threshold associated with the first processing core, where the second processing core has a different processing capacity than the first processing core.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
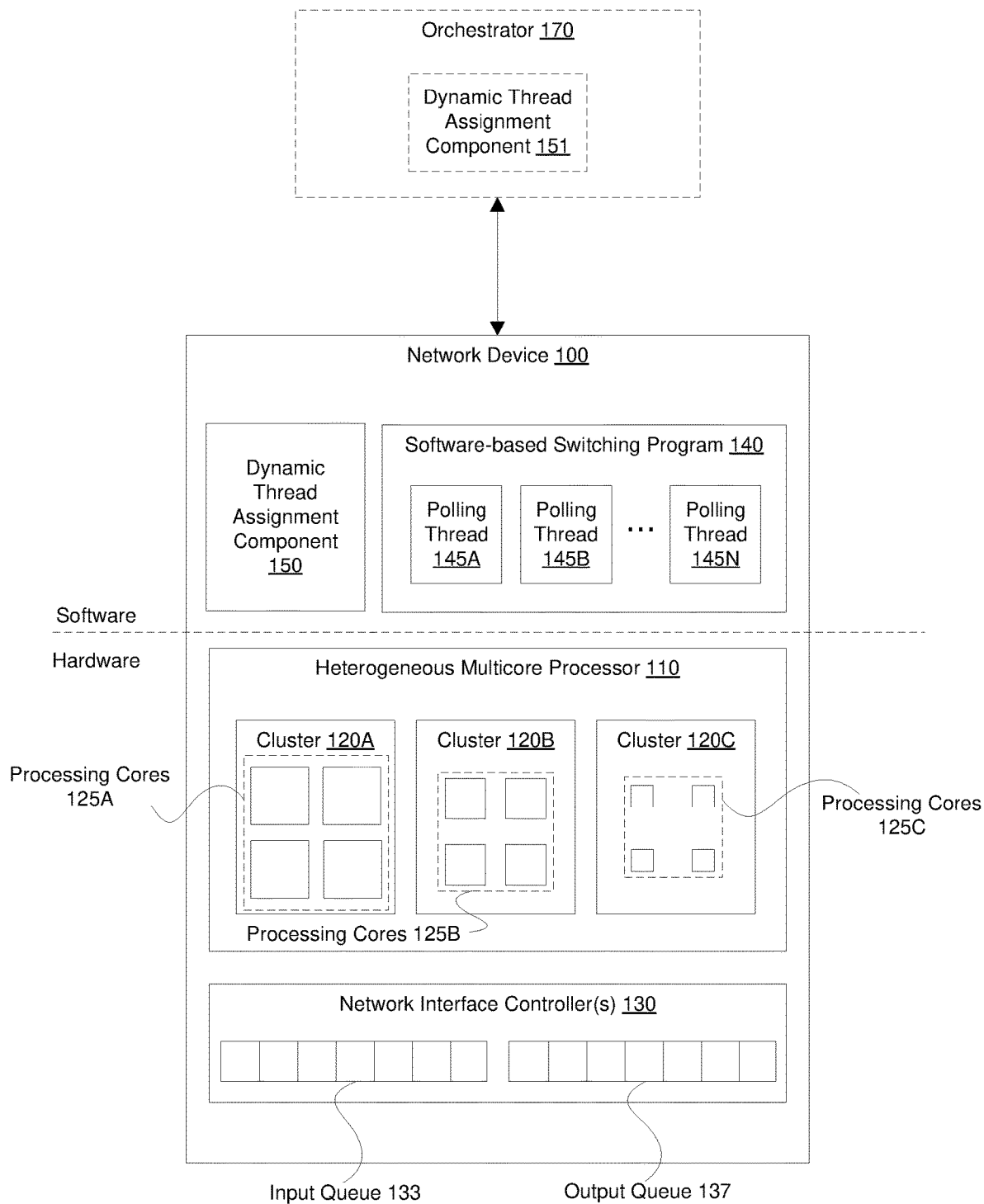
FIG. 1 is a block diagram of a network device that is configured to orchestrate execution of a polling thread of a software-based switching program on a heterogeneous multicore processor, according to some embodiments.

The following description describes methods and apparatus for efficiently orchestrating execution of software-based switching applications on heterogeneous multicore processors. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

As mentioned above, high-performance switching applications typically use a polling-based mechanism for reading packets from network interface controller (NIC) input queues (as opposed to using an interrupt-based mechanism). A software-based switching program typically includes multiple polling threads that continuously poll for packets from the input queues. When a packet is available in an input queue, a polling thread reads the packet from the input queue, processes the packet for forwarding (e.g., parses the packet, performs actions on the packet such as pushing/popping a Virtual Local Area Network (VLAN) header and modifying the source Media Access Control (MAC) address, and performs lookup in forwarding tables), and eventually places the processed packet into an output queue for transmission. Due to continuous polling, the polling thread keeps the processing core it is executing on completely busy even when the input queues are empty.

Software-based switching programs have traditionally been executed on homogeneous multicore processors, where all of the processing cores have the same processing capacity (e.g., same frequency rating). However, the use of heterogeneous multicore processors is becoming increasingly popular. A heterogenous multicore processor typically includes multiple clusters of processing cores, where processing cores in the same cluster have the same/similar processing capacities and where processing cores in different clusters have different processing capacities. For example, a heterogenous processor may include two clusters, where one cluster includes a set of high performance processing cores and the other cluster includes a set of low performance processing cores (e.g., which run at a lower frequency and consume less power compared to the high performance processing cores). However, software-based switching programs are not optimized to be executed on heterogeneous multicore processors and thus may not utilize such processors in an efficient manner.

Embodiments described herein provide an efficient mechanism for orchestrating execution of a polling thread of a software-based switching program on a heterogeneous multicore processor. According to some embodiments, a polling thread of a software-based switching program is caused to be executed on a first processing core in a first cluster of processing cores of a heterogeneous multicore processor. A value indicative of a number of active processing cycles used by the polling thread is then determined. If the value is determined to be higher than a high threshold associated with the first processing core or lower than a low threshold associated with the first processing core, then the polling thread is caused to be moved to a second processing core in a second cluster of processing cores of the heterogeneous multicore processor, where the second processing core has a different processing capacity than the first processing core. Various embodiments are further described herein below.

FIG. 1 is a block diagram of a network device that is configured to orchestrate execution of a polling thread of a software-based switching program on a heterogeneous multicore processor, according to some embodiments. As shown in the diagram, the network device 100 includes a heterogeneous multicore processor 110 and network interface controller(s) 130. The heterogeneous multicore processor 110 includes clusters 120A-C, where each cluster 120 includes four processing cores (cluster 120A includes processing cores 125A, cluster 120B includes processing cores 125B, and cluster 120C includes processing cores 125C—processing cores 125 may also be referred to as processor cores, central processing unit (CPU) cores, or simply as cores). Processing cores 125 in the same cluster 120 have the same or similar processing capacities, whereas processing cores 125 in different clusters 120 have different processing capacities. As used herein, processing capacity refers to the capacity of a processing core for executing instructions. For example, the processing capacity of a processing core 125 may refer to the clock rate or rated frequency of that processing core, which may be measured in terms of clock cycles per second (Hertz). In the example shown in the diagram, the processing cores 125A in cluster 120A have higher processing capacity than the processing cores 125B in cluster 120B, which in turn have higher processing capacity than the processing cores 125C in cluster 120C. In the diagram, processing cores 125 having higher processing capacities are depicted as being larger in size compared to the processing cores having lower processing capacities (e.g., processing cores 125A in cluster 120A are depicted as being larger than the processing cores 125B in cluster 120B and the processing cores 125B in cluster 120B are depicted as being larger than the processing cores 125C in cluster 120C). It should be understood, however, that the size of the processing cores depicted in the diagram are not necessarily meant to represent or indicate the physical size of the processing cores 125. Having multiple processing cores 125 with different processing capacities makes processor 110 a "heterogenous" multicore processor. While the heterogeneous multicore processor 110 is shown in the diagram as including three clusters 120 that each include four processing cores 125, it should be understood that this is merely by way of example and that in other embodiments the heterogenous multicore processor 110 can include a different number of clusters 120 and/or a different number of processing cores 125 in each cluster 120. Also, it is possible for different clusters 120 to include a different number of processing cores 125.

The network interface controller(s) 130 (which may also be referred to as a network interface card, network adapter, or Local Area Network (LAN) adapter) is a component that allows the network device 100 to establish network connections (to transmit and/or receive code and/or data using propagating signals over a wire or wirelessly) with other network devices. The network interface controller(s) 130 may include an input queue 133 (i.e., receive queue) and an output queue 137 (i.e., transmit queue). Packets being received by the network device 100 are placed in the input queue 133 and packets being transmitted by the network device 100 are placed in the output queue 137.

The network device 100 may execute a software-based switching program 140 on the heterogenous multicore processor 110 to implement switching functionality. The software-based switching program 140 may include one or more polling threads 145A-N. Each polling thread 145 may execute on one of the processing cores 125. During operation, each polling thread 145 continuously polls for packets to process from an input queue 133. When a packet is available in the input queue 133, the polling thread 145 reads the packet from the input queue 133, processes the packet for forwarding (e.g., parses the packet, performs actions on the packet such as pushing/popping a VLAN header and modifying the source MAC address, and/or performs lookup in forwarding tables), and eventually places the processed packet into an output queue 137 for transmission. Due to continuous polling, the polling thread 145 keeps the processing core 125 it is executing on completely busy even when the input queue 133 is empty.

The processing cycles used by a polling thread 145 of the software-based switching program 140 can be divided into two parts: (1) active processing cycles and (2) idle processing cycles. As used herein active processing cycles are processing cycles during which the polling thread 145 is processing (or otherwise working with) a packet. This includes processing cycles during which the polling thread 145 is reading packets from the input queue 133, processing packets for forwarding, and placing packets into the output queue 137 for transmission. In contrast, idle processing cycles are processing cycles during which the polling thread 145 polls an empty input queue 133 (waiting for a packet to process). Thus, the total number of processing cycles used by a polling thread 145 can be seen as the sum of the number of active processing cycles and the number of idle processing cycles. It should be noted that while the polling thread is not performing any "useful" work during the idle processing cycles, it is still using up processing cycles of the processing core 125 (to perform polling).

In one embodiment, the network device 100 includes a dynamic thread assignment component 150 that orchestrates the execution of polling threads 145 of the software-based switching program 140 on the heterogeneous multicore processor 110. As will be described further herein below, the dynamic thread assignment component 150 may monitor the processor utilization of the polling threads 145 and determine when a given polling thread 145 should be moved to another processing core 125. In one embodiment, the dynamic thread assignment component 150 measures/collects the number of active processing cycles used by a given polling thread 145. The dynamic thread assignment component 150 may then determine a value that is indicative of the number of active processing cycles used by that polling thread 145. The value may be, for example, an average number of active processing cycles per second used by the polling thread 145 over a period of time (T). In one embodiment, the value is a cumulative (historical) average that averages the measurements taken over several intervals. This may help soften the impact that sudden drastic changes to the number of active processing cycles used by the polling thread 145. For example, assume that the dynamic thread assignment component 150 measures the average number of active processing cycles used by the polling thread 14) over intervals $0-T_1$, $T_1-T_2$, and $T_2-T_3$ (e.g., each having duration T) to be $M_1$, $M_2$, and $M_3$, respectively. The cumulative average in this example may be calculated as $(M_1+M_2+M_3)/3$. In one embodiment, the value may be an average number of processing cycles per second used by the polling thread to process a given number of packets. The dynamic thread assignment component 150 may then compare the value against a threshold associated with the current processing core 125 that the polling thread 145 is executing on to determine whether the polling thread 145 should remain on that processing core 125 or be moved to a different processing core 125 having a different processing capacity (e.g., in a different cluster 120). The dynamic thread assignment component 150 may be implemented using any combination of hardware, software, and firmware.

In one embodiment, each processing core 125 is associated with a high threshold and a low threshold. In one embodiment, the high threshold and the low threshold associated with a processing core 125 can be configured as a percentage of that processing core's processing capacity. For example, the high threshold can be configured to be 80 percent of the processing core's processing capacity and the low threshold can be configured to be 30 percent of the processing core's processing capacity. Thus, as an example, if it is assumed that a processing core 125 in cluster 120A has a processing capacity of 10,000 cycles per second (Hz), then the high threshold for that processing core 125 would be 8,000 cycles per second and the low threshold for that processing core 125 would be 3,000 cycles per second. The other processing cores 125 in the same cluster 120A would have the same thresholds (assuming they have the same/similar processing capacities). Further, if it is assumed that a processing core 125 in cluster 120B has a processing capacity of 20,000 cycles per second, then the high threshold for that processing core 125 would be 16,000 cycles per second and the low threshold for that processing core 125 would be 6,000 cycles per second. The other processing cores 125 in the same cluster 120B would have the same thresholds (assuming they have the same/similar processing capacities). Further, if it is assumed that a processing core in cluster 120C has a processing capacity of 30,000 cycles per second, then the high threshold for that processing core 125 would be 24,000 cycles per second and the low threshold for that processing core 125 would be 9,000 cycles per second. The other processing cores 125 in the same cluster 120C would have the same thresholds (assuming they have the same/similar processing capacities).

In one embodiment, the dynamic thread assignment component 150 periodically determines a value indicative of the number of active processing cycles used by a given polling thread 145 and compares that value to the high threshold and/or low threshold associated with the current processing core 125 that the polling thread 145 is executing on. If the value is greater than the high threshold associated with the current processing core 125, then the dynamic thread assignment component 150 may cause the polling thread to move to the next highest processing capacity processing core 125. However, if the value is lower than the low threshold associated with the current processing core 125, then the dynamic thread assignment component 150 may cause the polling thread 145 to move to the next lowest processing capacity processing core 125. Otherwise, the dynamic thread assignment component 150 keeps the polling thread 145 on the current processing core 125. The dynamic thread assignment component 150 may periodically (e.g., after given time intervals and/or responsive to a triggering event) perform similar operations to determine whether to move the polling thread 145 to a different processing core 125 depending on the number of active processing cycles used by the polling thread 145.

In one embodiment, the network device 100 is communicatively coupled to an orchestrator 170 and is managed by the orchestrator 170. The orchestrator 170 may be for example a cloud orchestrator or a software defined networking (SDN) controller or other type of management device/tool/entity that is able to manage/configure the network device 100. In one embodiment, the orchestrator 170 includes a dynamic thread assignment component 151 that orchestrates the execution of polling threads 145 of the software-based switching program 140 on the heterogeneous multicore processor 110. In one embodiment, the dynamic thread assignment component 151 of the orchestrator 170 can perform similar operations as the dynamic thread assignment component 150 of the network device 100 to determine whether a polling thread should be moved to a different processing core 125. For example, the dynamic thread assignment component 151 may determine a value indicative of the number of active processing cycles used by a given polling thread 145. The dynamic thread assignment component 151 may determine the value based on receiving the value (or other measurement of the number of active processing cycles used by the polling thread 145) from the network device 100 (e.g., the value may have been generated/measured by the dynamic thread assignment component 150 of the network device 100 and sent to the orchestrator 170). The dynamic thread assignment component 151 may then compare the received value to the high threshold and/or low threshold associated with the current processing core 125 that the polling thread is executing on, and cause the polling thread 145 to stay on the current processing core 125 or move to a different processing core 125 (having a different processing capacity than the current processing core) depending on the results of the comparisons (e.g., by sending instructions to the network device 100). Thus, in some embodiments, the decision of whether a polling thread 145 should be moved to a different processing core 125 can be made locally by the dynamic thread assignment component 150 of the network device 100 or made at the orchestrator level by the dynamic thread assignment component 151 of the orchestrator 170. While the diagram shows the orchestrator 170 managing a single network device 100, it should be understood that the orchestrator 170 can manage additional network devices and that the dynamic thread assignment component 151 of the orchestrator 170 can orchestrate the execution of polling threads of software-based switching programs 140 running on heterogeneous multicore processors 110 of these other network devices 100.

An advantage of this technique is that polling threads 145 having more active workloads (e.g., more active processing cycles) are placed on higher processing capacity processing cores 125 while polling threads 145 having lower active workloads (e.g., less active processing cycles and more idle processing cycles) are placed on lower processing capacity processing cores 125. That is, polling threads 145 are dynamically assigned to processing cores 125 during execution in a manner that takes into account their active workloads (e.g., the number active processing cycles used by the polling threads 145). This helps to utilize the heterogeneous multicore processor 110 more efficiently. For example, placing a polling thread having a low active workload on a high processing capacity processing core 125 may be wasteful since most of the processing cycles will be used for polling an empty input queue 133 (instead of doing active work on the packet) while consuming the full power of the processing core 125. The techniques described herein may place such a polling thread 145 on a lower processing capacity processing core 125 to conserve power while still minimizing/reducing service disruption, if any. In a similar vein, placing a polling thread having a highly active workload on a low processing capacity processing core 125 may cause service disruptions if the processing core 125 is not able to handle the workload. The techniques described herein may place such a polling thread 145 on a higher processing capacity processing core 125 that is better able to handle the workload.

Figure 2:
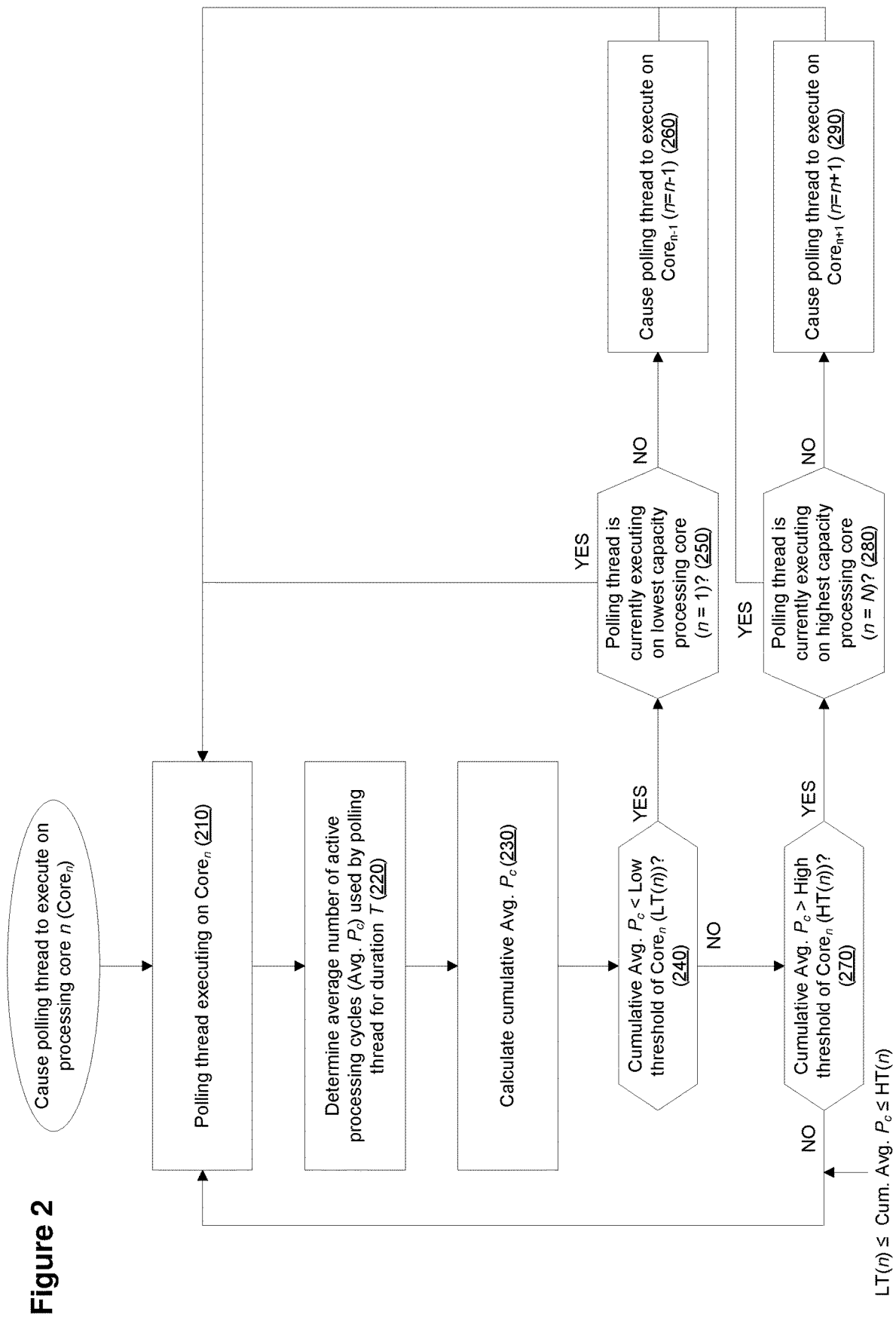
FIG. 2 is a flow diagram of a process for orchestrating execution of a polling thread of a software-based switching program on a heterogeneous multicore processor, according to some embodiments.

FIG. 2 is a flow diagram of a process for orchestrating execution of a polling thread of a software-based switching program on a heterogeneous multicore processor, according to some embodiments. In one embodiment, the process is implemented by a network device (e.g., the dynamic thread assignment component 150/151 of the network device 100 or the orchestrator 170). The process assumes that there are N processing cores allocated for the polling thread, one from each cluster. These processing cores are labeled $Core_1$, $Core_2$, ..., $Core_N$, where $Core_1$ has the lowest processing capacity, $Core_2$ has the next highest processing capacity, and so on, where $Core_N$ has the highest processing capacity. The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

The process is initiated by the network device causing a polling thread to execute on a given processing core n ($Core_n$). Thus, at block 210, the polling thread is executing on $Core_n$ (thus $Core_n$ is considered the "current" processing core). At block 220, the network device determines the average number of active processing cycles used by the polling thread over a given duration (T) (the average is denoted as Avg. $P_c$). At block 230, the network device determines the cumulative average (e.g., the average over several intervals of duration T). At decision block 240, the network device determines whether the average number of active processing cycles used by the polling thread is less than the low threshold associated with the current processing core ($Core_n$) (the low threshold associated with $Core_n$ is denoted as LT(n)). If so, at decision block 250, the network device determines whether the polling thread is currently executing on the lowest processing capacity processing core (n=1). If so, the network device keeps the polling thread on the current processing core (since it is already on the lowest processing capacity processing core) and the process continues to block 210. However, if the network device determines that the polling thread is not currently executing on the lowest processing capacity processing core, then at block 260, the network device causes the polling thread to execute on a processing core having the next lowest processing capacity ($Core_{n-1}$) and the process continues to block 210. Returning to decision block 240, if the network device determines that the average number of active processing cycles used by the polling thread is not less than the low threshold associated with the current processing core, then at decision block 270, the network device determines whether the average number of active processing cycles used by the polling thread is greater than the high threshold associated with the current processing core ($Core_n$) (the high threshold associated with $Core_n$ is denoted as $HT(n)$). If so, at decision block 280, the network device determines whether the polling thread is currently executing on the highest processing capacity processing core (n=N). If so, then the network device keeps the polling thread on the current processing core (since it is already on the highest processing capacity processing core) and the process continues to block 210. However, if the network device determines that the polling thread is not currently executing on the highest processing capacity processing core, then at block 290, the network device causes the polling thread to execute on a processing core having the next highest processing capacity ($Core_{n+1}$) and the process continues to block 210. Returning to decision block 270, if the network device determines that the average number of active processing cycles used by the polling thread is not greater than the high threshold associated with the current processing core (which indicates that the average number of active processing cycles used by the polling thread is greater than or equal to the low threshold associated with the current processing core and less than or equal to the high threshold associated with the current processing core), then the network device keeps the polling thread on the current processing core and the process continues to block 210. The network device may periodically repeat one or more of operations 210-290 of the flow diagram to cause the polling thread to be placed on the appropriate processing core.

Figure 3:
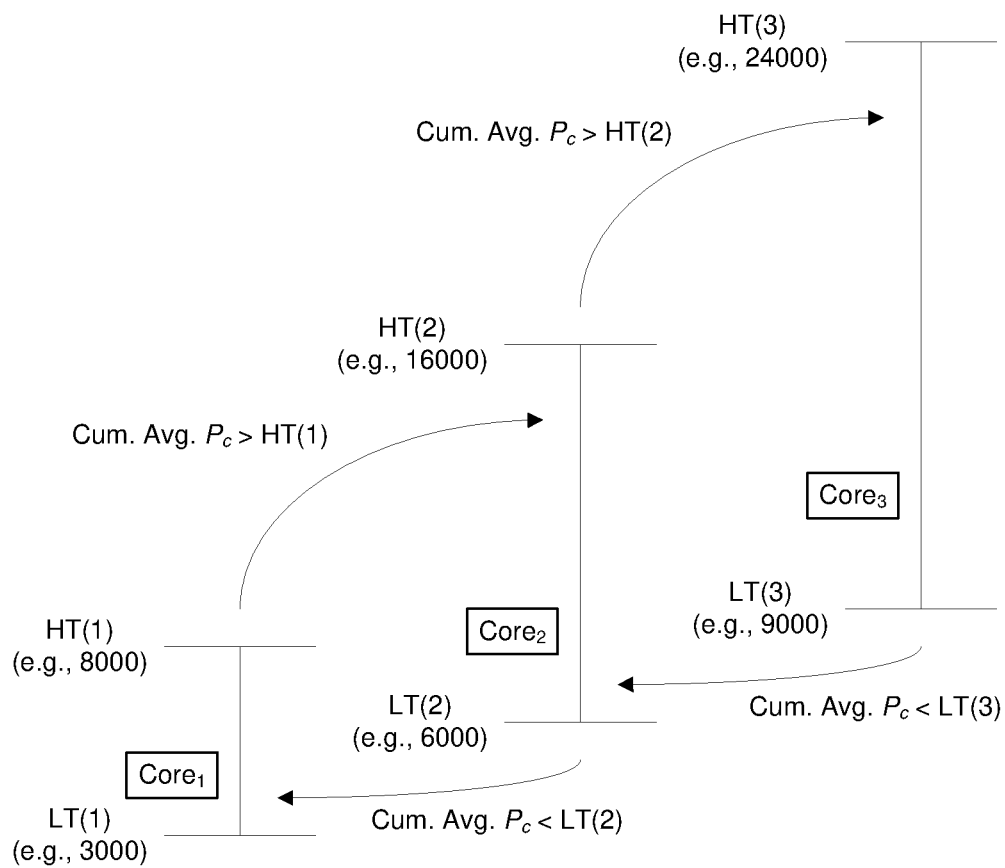
FIG. 3 is a diagram illustrating exemplary scenarios in which a polling thread is moved onto different processing cores, according to some embodiments.

FIG. 3 is a diagram illustrating exemplary scenarios in which a polling thread is moved onto different processing cores, according to some embodiments. The example shown in the diagram assumes that there are three processing cores allocated for the polling thread (one from each of the clusters). The first processing core has a processing capacity of 10,000 cycles per second. The low threshold associated with the first processing core is 3,000 cycles per second and the high threshold associated with the first processing core is 8,000 cycles per second. The second processing core has a processing capacity of 20,000 cycles per second. The low threshold associated with the second processing core is 6,000 cycles per second and the high threshold associated with the second processing core is 16,000 cycles per second. The third processing core has a processing capacity of 30,000 cycles per second. The low threshold associated with the third processing core is 9,000 cycles per second and the high threshold associated with the third processing core is 24,000 cycles per second. It should be understood that the processing capacities of the processing cores and the thresholds associated with the processing cores used in this example are by way of example and not intended to be limiting. It should be understood that other embodiments may have processing cores with different processing capacities than the example shown here and that the thresholds associated with those processing cores can be configured differently. Preferably, however, the threshold should be configured to avoid a polling thread from oscillating between processing cores (e.g., the low threshold associated with a given processing core should not be configured to be higher than the high threshold associated with the processing core having the next lowest processing capacity—this could cause the polling thread to oscillate between the processing cores).

As shown in the diagram, when the polling thread is executing on the first processing core ($Core_1$), if the cumulative average number of active processing cycles used by the polling thread (Cum. Avg. $P_c$) (in some embodiments, a non-cumulative average can be used) is greater than the high threshold associated with the first processing core, the polling thread moves to the next highest processing capacity processing core, which in this example is the second processing core ($Core_2$). Otherwise, the polling thread remains on the first processing core.

When the polling thread is executing on the second processing core, if the cumulative average number of active processing cycles used by the polling thread is less than the low threshold associated with the second processing core, then the polling thread moves to the next lowest processing capacity processing core, which in this example is the first processing core. However, if the cumulative average number of active processing cycles used by the polling thread is greater than the high threshold associated with the second processing core, then the polling thread moves to the next highest processing capacity processing core, which in this example is the third processing core ($Core_3$). Otherwise, the polling thread remains on the second processing core.

When the polling thread is executing on the third processing core, if the cumulative average number of active processing cycles used by the polling thread is less than the low threshold associated with the third processing core, then the polling thread moves to the next lowest processing capacity processing core, which in this example is the second processing core. Otherwise, the polling thread remains on the third processing core.

Figure 4:
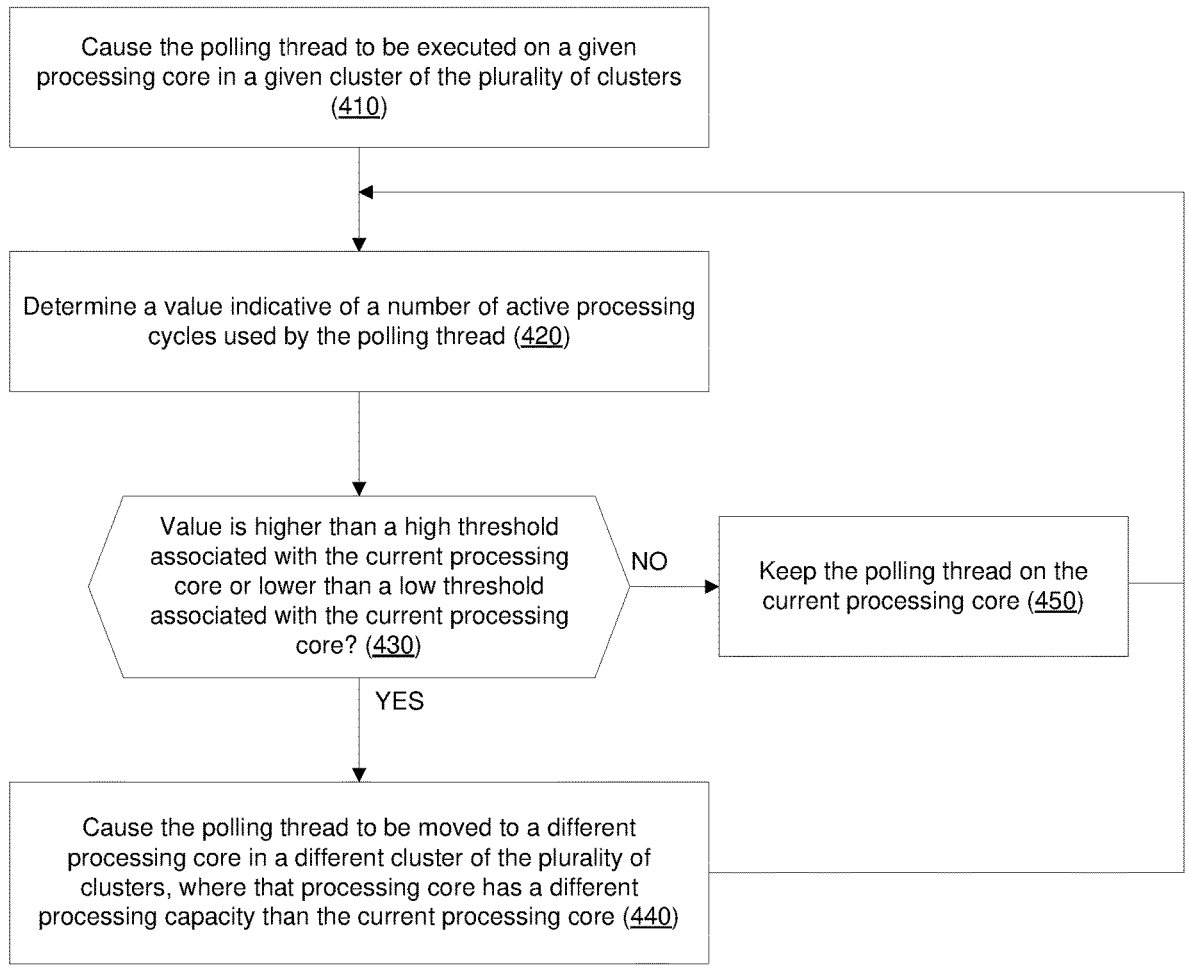
FIG. 4 is a flow diagram of a process for orchestrating execution of a polling thread of a software-based switching program on a heterogeneous multicore processor, according to some embodiments.

FIG. 4 is a flow diagram of a process for orchestrating execution of a polling thread of a software-based switching program on a heterogeneous multicore processor, according to some embodiments. The heterogeneous multicore processor includes a plurality of clusters of processing cores, where processing cores in the same cluster have the same processing capacity (e.g., same frequency rating) and processing cores in different clusters have different processing capacities. In one embodiment, the process is implemented by a network device (e.g., the dynamic thread assignment component 150/151 of the network device 100 or the orchestrator 170).

At block 410, the network device causes the polling thread to be executed on a given processing core in a given cluster of the plurality of clusters.

At block 420, the network device determines a value indicative of a number of active processing cycles used by the polling thread. In one embodiment, the active processing cycles used by the polling thread include processing cycles during which the polling thread is reading packets from an input queue, processing packets for forwarding, and placing packets into an output queue but does not include processing cycles during which the polling thread is polling for packets to process from an empty input queue. In one embodiment, the value is determined to be an average number of active processing cycles used by the polling thread per second (e.g., over a given duration (T)). In one embodiment, the value is a cumulative (historical) average of the number of active processing cycles used by the polling thread (e.g., over a plurality of intervals, each having duration T). In one embodiment, the value is determined to be an average number of active processing cycles used by the polling thread to process a predefined number of packets.

At decision block 430, the network device determines whether the value is higher than a high threshold associated with the current processing core or lower than a low threshold associated with the current processing core. If not, at block 450, the network device keeps the polling thread on the current processing core and the process returns to block 420. In one embodiment, the network device configures the thresholds (e.g., the high threshold and/or the low threshold) associated with the first processing core (e.g., based on the hardware capabilities and application needs). For example, the network device may configure the low threshold associated with the first processing core and/or the high threshold associated with the first processing core to be a percentage of a processing capacity of the first processing core (e.g., configure the low threshold to be 30 percent of the first processing core's processing capacity and configure the high threshold to be 80 percent of the first processing core's processing capacity).

If the network device determines that the value is higher than the high threshold associated with the current processing core or the value is lower than the low threshold associated with the processing core, then at block 440, the network device causes the polling thread to be moved to a different processing core in a different cluster of the plurality of clusters, where that processing core has a different processing capacity than the current processing core. In one embodiment, the network device selects the second processing core to be a processing core having a higher processing capacity than the first processing core (e.g., the processing core having the next highest processing capacity) in response to the determination that the value is greater than the high threshold associated with the first processing core. In such an embodiment, the second processing core may be associated with a low threshold, where the low threshold associated with the second processing core is lower than the high threshold associated with the first processing core. In one embodiment, the network device selects the second processing core to be a processing core having a lower processing capacity than the first processing core (e.g., the processing core having the next lowest processing capacity) in response to the determination that the value is lower than the low threshold associated with the first processing core. In such an embodiment, the second processing core may be associated with a high threshold, where the high threshold associated with the second processing core is higher than the low threshold associated with the first processing core. After the polling thread is moved to the new processing core, the process may then return to block 420 to repeat one or more of operations 420-450.

While various embodiments have been primarily described herein in the context of orchestrating execution of polling threads of a software-based switching program, it should be understood that the techniques described herein can be applied to other types of programs/applications that use polling threads.

Figure 5A:
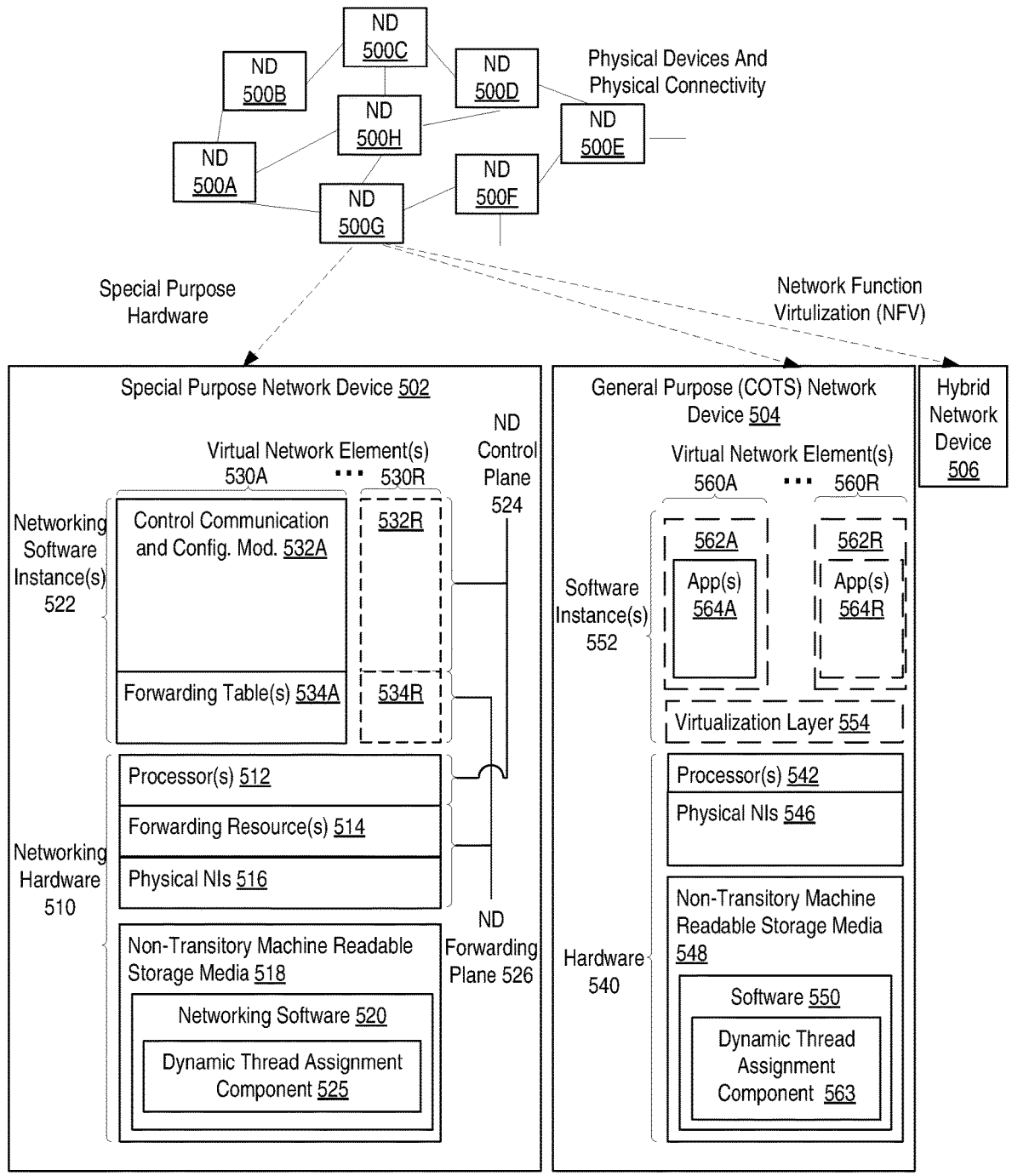
FIG. 5A illustrates connectivity between network devices (NDs) within an exemplary network, as well as three exemplary implementations of the NDs, according to some embodiments.

FIG. 5A illustrates connectivity between network devices (NDs) within an exemplary network, as well as three exemplary implementations of the NDs, according to some embodiments. FIG. 5A shows NDs 500A-H, and their connectivity by way of lines between 500A-500B, 500B-500C, 500C-500D, 500D-500E, 500E-500F, 500F-500G, and 500A-500G, as well as between 500H and each of 500A, 500C, 500D, and 500G. These NDs are physical devices, and the connectivity between these NDs can be wireless or wired (often referred to as a link). An additional line extending from NDs 500A, 500E, and 500F illustrates that these NDs act as ingress and egress points for the network (and thus, these NDs are sometimes referred to as edge NDs; while the other NDs may be called core NDs).

Two of the exemplary ND implementations in FIG. 5A are: 1) a special-purpose network device 502 that uses custom application-specific integrated-circuits (ASICs) and a special-purpose operating system (OS); and 2) a general purpose network device 504 that uses common off-the-shelf (COTS) processors and a standard OS.

The special-purpose network device 502 includes networking hardware 510 comprising a set of one or more processor(s) 512, forwarding resource(s) 514 (which typically include one or more ASICs and/or network processors), and physical network interfaces (NIs) 516 (through which network connections are made, such as those shown by the connectivity between NDs 500A-H), as well as non-transitory machine readable storage media 518 having stored therein networking software 520. During operation, the networking software 520 may be executed by the networking hardware 510 to instantiate a set of one or more networking software instance(s) 522. Each of the networking software instance(s) 522, and that part of the networking hardware 510 that executes that network software instance (be it hardware dedicated to that networking software instance and/or time slices of hardware temporally shared by that networking software instance with others of the networking software instance(s) 522), form a separate virtual network element 530A-R. Each of the virtual network element(s) (VNEs) 530A-R includes a control communication and configuration module 532A-R (sometimes referred to as a local control module or control communication module) and forwarding table(s) 534A-R, such that a given virtual network element (e.g., 530A) includes the control communication and configuration module (e.g., 532A), a set of one or more forwarding table(s) (e.g., 534A), and that portion of the networking hardware 510 that executes the virtual network element (e.g., 530A)

Software 520 can include code such as dynamic thread assignment component 525, which when executed by networking hardware 510, causes the special-purpose network device 502 to perform operations of one or more embodiments described herein above as part networking software instances 522 (e.g., to orchestrate execution of polling threads on a heterogeneous multicore processor as described herein).

The special-purpose network device 502 is often physically and/or logically considered to include: 1) a ND control plane 524 (sometimes referred to as a control plane) comprising the processor(s) 512 that execute the control communication and configuration module(s) 532A-R; and 2) a ND forwarding plane 526 (sometimes referred to as a forwarding plane, a data plane, or a media plane) comprising the forwarding resource(s) 514 that utilize the forwarding table(s) 534A-R and the physical NIs 516. By way of example, where the ND is a router (or is implementing routing functionality), the ND control plane 524 (the processor(s) 512 executing the control communication and configuration module(s) 532A-R) is typically responsible for participating in controlling how data (e.g., packets) is to be routed (e.g., the next hop for the data and the outgoing physical NI for that data) and storing that routing information in the forwarding table(s) 534A-R, and the ND forwarding plane 526 is responsible for receiving that data on the physical NIs 516 and forwarding that data out the appropriate ones of the physical NIs 516 based on the forwarding table(s) 534A-R.

Figure 5B:
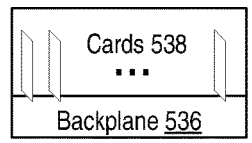
FIG. 5B illustrates an exemplary way to implement a special-purpose network device according to some embodiments.

FIG. 5B illustrates an exemplary way to implement the special-purpose network device 502 according to some embodiments. FIG. 5B shows a special-purpose network device including cards 538 (typically hot pluggable). While in some embodiments the cards 538 are of two types (one or more that operate as the ND forwarding plane 526 (sometimes called line cards), and one or more that operate to implement the ND control plane 524 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 536 (e.g., a first full mesh coupling the line cards and a second full mesh coupling all of the cards).

Returning to FIG. 5A, the general purpose network device 504 includes hardware 540 comprising a set of one or more processor(s) 542 (which are often COTS processors) and physical NIs 546, as well as non-transitory machine readable storage media 548 having stored therein software 550. During operation, the processor(s) 542 execute the software 550 to instantiate one or more sets of one or more applications 564A-R. While one embodiment does not implement virtualization, alternative embodiments may use different forms of virtualization. For example, in one such alternative embodiment the virtualization layer 554 represents the kernel of an operating system (or a shim executing on a base operating system) that allows for the creation of multiple instances 562A-R called software containers that may each be used to execute one (or more) of the sets of applications 564A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 554 represents a hypervisor (sometimes referred to as a virtual machine monitor (VMM)) or a hypervisor executing on top of a host operating system, and each of the sets of applications 564A-R is run on top of a guest operating system within an instance 562A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 540, directly on a hypervisor (in which case the unikernel is sometimes described as running within a LibOS virtual machine), or in a software container, embodiments can be implemented fully with unikernels running directly on a hypervisor represented by virtualization layer 554, unikernels running within software containers represented by instances 562A-R, or as a combination of unikernels and the above-described techniques (e.g., unikernels and virtual machines both run directly on a hypervisor, unikernels and sets of applications that are run in different software containers).

The instantiation of the one or more sets of one or more applications 564A-R, as well as virtualization if implemented, are collectively referred to as software instance(s) 552. Each set of applications 564A-R, corresponding virtualization construct (e.g., instance 562A-R) if implemented, and that part of the hardware 540 that executes them (be it hardware dedicated to that execution and/or time slices of hardware temporally shared), forms a separate virtual network element(s) 560A-R.

The virtual network element(s) 560A-R perform similar functionality to the virtual network element(s) 530A-R—e.g., similar to the control communication and configuration module(s) 532A and forwarding table(s) 534A (this virtualization of the hardware 540 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 562A-R corresponding to one VNE 560A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 562A-R to VNEs also apply to embodiments where such a finer level of granularity and/or unikernels are used.

In certain embodiments, the virtualization layer 554 includes a virtual switch that provides similar forwarding services as a physical Ethernet switch. Specifically, this virtual switch forwards traffic between instances 562A-R and the physical NI(s) 546, as well as optionally between the instances 562A-R; in addition, this virtual switch may enforce network isolation between the VNEs 560A-R that by policy are not permitted to communicate with each other (e.g., by honoring virtual local area networks (VLANs)).

Software 550 can include code such as dynamic thread assignment component 563, which when executed by processor(s) 542, cause the general purpose network device 404 to perform operations of one or more embodiments described herein above as part software instances 562A-R (e.g., to orchestrate execution of polling threads on a heterogeneous multicore processor as described herein).

The third exemplary ND implementation in FIG. 5A is a hybrid network device 506, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 502) could provide for para-virtualization to the networking hardware present in the hybrid network device 506.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 530A-R, VNEs 560A-R, and those in the hybrid network device 506) receives data on the physical NIs (e.g., 516, 546) and forwards that data out the appropriate ones of the physical NIs (e.g., 516, 546). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 5C:
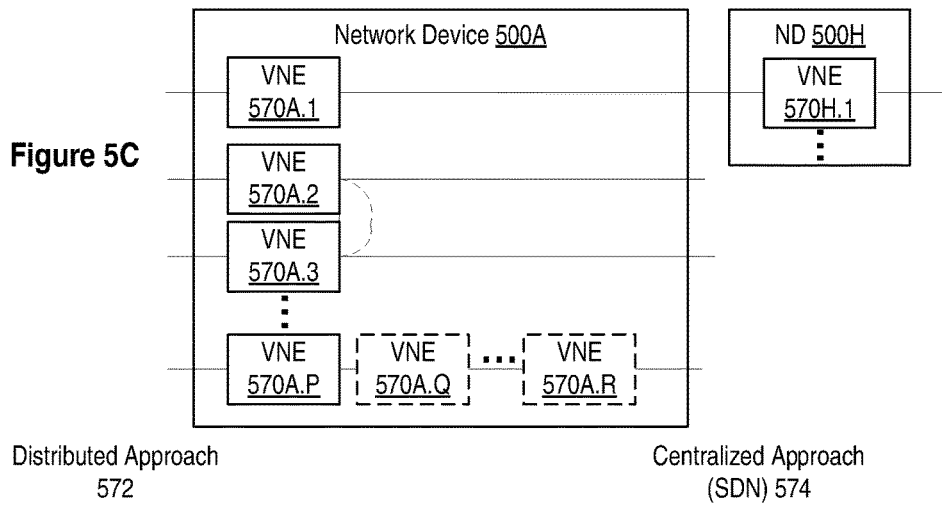
FIG. 5C illustrates various exemplary ways in which virtual network elements (VNEs) may be coupled according to some embodiments.

FIG. 5C illustrates various exemplary ways in which VNEs may be coupled according to some embodiments. FIG. 5C shows VNEs 570A.1-570A.P (and optionally VNEs 570A.Q-570A.R) implemented in ND 500A and VNE 570H.1 in ND 500H. In FIG. 5C, VNEs 570A.1-P are separate from each other in the sense that they can receive packets from outside ND 500A and forward packets outside of ND 500A; VNE 570A.1 is coupled with VNE 570H.1, and thus they communicate packets between their respective NDs; VNE 570A.2-570A.3 may optionally forward packets between themselves without forwarding them outside of the ND 500A; and VNE 570A.P may optionally be the first in a chain of VNEs that includes VNE 570A.Q followed by VNE 570A.R (this is sometimes referred to as dynamic service chaining, where each of the VNEs in the series of VNEs provides a different service—e.g., one or more layer 4-7 network services). While FIG. 5C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 5A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 5A may also host one or more such servers (e.g., in the case of the general purpose network device 504, one or more of the software instances 562A-R may operate as servers; the same would be true for the hybrid network device 506; in the case of the special-purpose network device 502, one or more such servers could also be run on a virtualization layer executed by the processor(s) 512); in which case the servers are said to be co-located with the VNEs of that ND.

A virtual network is a logical abstraction of a physical network (such as that in FIG. 5A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 5D:
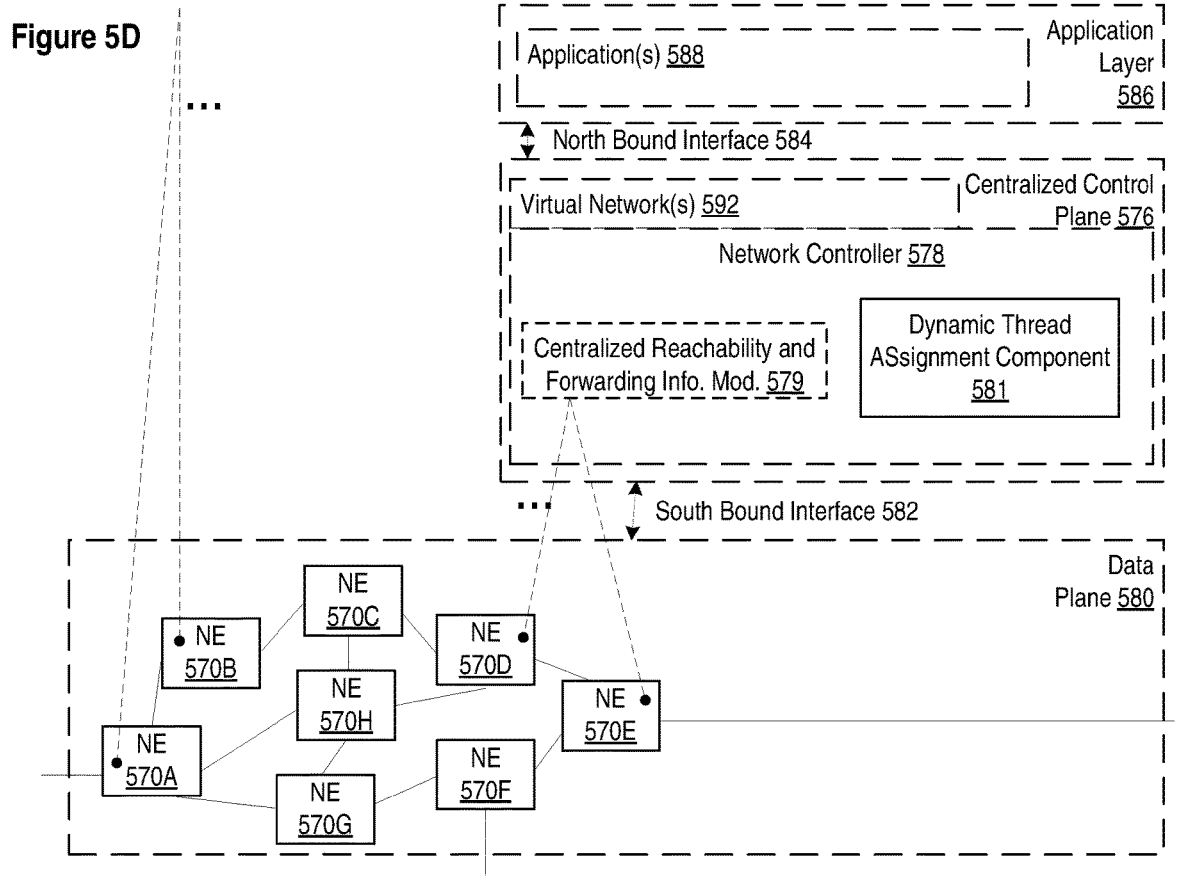
FIG. 5D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments.

FIG. 5D illustrates a network with a single network element on each of the NDs of FIG. 5A, and within this straight forward approach contrasts a traditional distributed approach (commonly used by traditional routers) with a centralized approach for maintaining reachability and forwarding information (also called network control), according to some embodiments. Specifically, FIG. 5D illustrates network elements (NEs) 570A-H with the same connectivity as the NDs 500A-H of FIG. 5A.

FIG. 5D illustrates that the distributed approach 572 distributes responsibility for generating the reachability and forwarding information across the NEs 570A-H; in other words, the process of neighbor discovery and topology discovery is distributed.

For example, where the special-purpose network device 502 is used, the control communication and configuration module(s) 532A-R of the ND control plane 524 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 570A-H (e.g., the processor(s) 512 executing the control communication and configuration module(s) 532A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 524. The ND control plane 524 programs the ND forwarding plane 526 with information (e.g., adjacency and route information) based on the routing structure(s). For example, the ND control plane 524 programs the adjacency and route information into one or more forwarding table(s) 534A-R (e.g., Forwarding Information Base (FIB), Label Forwarding Information Base (LFIB), and one or more adjacency structures) on the ND forwarding plane 526. For layer 2 forwarding, the ND can store one or more bridging tables that are used to forward data based on the layer 2 information in that data. While the above example uses the special-purpose network device 502, the same distributed approach 572 can be implemented on the general purpose network device 504 and the hybrid network device 506.

FIG. 5D illustrates that a centralized approach 574 (also known as software defined networking (SDN)) that decouples the system that makes decisions about where traffic is sent from the underlying systems that forwards traffic to the selected destination. The illustrated centralized approach 574 has the responsibility for the generation of reachability and forwarding information in a centralized control plane 576 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 576 has a south bound interface 582 with a data plane 580 (sometime referred to as the infrastructure layer, network forwarding plane, or forwarding plane (which should not be confused with a ND forwarding plane)) that includes the NEs 570A-H (sometimes referred to as switches, forwarding elements, data plane elements, or nodes). The centralized control plane 576 includes a network controller 578, which includes a centralized reachability and forwarding information module 579 that determines the reachability within the network and distributes the forwarding information to the NEs 570A-H of the data plane 580 over the south bound interface 582 (which may use the OpenFlow protocol). Thus, the network intelligence is centralized in the centralized control plane 576 executing on electronic devices that are typically separate from the NDs.

In one embodiment, the network controller 578 may include a dynamic thread assignment component 581 that when executed by the network controller 578, causes the network controller 578 to perform operations of one or more embodiments described herein above (e.g., to orchestrate execution of polling threads on a heterogeneous multicore processor as described herein).

For example, where the special-purpose network device 502 is used in the data plane 580, each of the control communication and configuration module(s) 532A-R of the ND control plane 524 typically include a control agent that provides the VNE side of the south bound interface 582. In this case, the ND control plane 524 (the processor(s) 512 executing the control communication and configuration module(s) 532A-R) performs its responsibility for participating in controlling how data (e.g., packets) is to be routed (e.g., the next hop for the data and the outgoing physical NI for that data) through the control agent communicating with the centralized control plane 576 to receive the forwarding information (and in some cases, the reachability information) from the centralized reachability and forwarding information module 579 (it should be understood that in some embodiments of the invention, the control communication and configuration module(s) 532A-R, in addition to communicating with the centralized control plane 576, may also play some role in determining reachability and/or calculating forwarding information—albeit less so than in the case of a distributed approach; such embodiments are generally considered to fall under the centralized approach 574, but may also be considered a hybrid approach).

While the above example uses the special-purpose network device 502, the same centralized approach 574 can be implemented with the general purpose network device 504 (e.g., each of the VNE 560A-R performs its responsibility for controlling how data (e.g., packets) is to be routed (e.g., the next hop for the data and the outgoing physical NI for that data) by communicating with the centralized control plane 576 to receive the forwarding information (and in some cases, the reachability information) from the centralized reachability and forwarding information module 579; it should be understood that in some embodiments of the invention, the VNEs 560A-R, in addition to communicating with the centralized control plane 576, may also play some role in determining reachability and/or calculating forwarding information—albeit less so than in the case of a distributed approach) and the hybrid network device 506. In fact, the use of SDN techniques can enhance the NFV techniques typically used in the general purpose network device 504 or hybrid network device 506 implementations as NFV is able to support SDN by providing an infrastructure upon which the SDN software can be run, and NFV and SDN both aim to make use of commodity server hardware and physical switches.

FIG. 5D also shows that the centralized control plane 576 has a north bound interface 584 to an application layer 586, in which resides application(s) 588. The centralized control plane 576 has the ability to form virtual networks 592 (sometimes referred to as a logical forwarding plane, network services, or overlay networks (with the NEs 570A-H of the data plane 580 being the underlay network)) for the application(s) 588. Thus, the centralized control plane 576 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 5D shows the distributed approach 572 separate from the centralized approach 574, the effort of network control may be distributed differently or the two combined in certain embodiments of the invention. For example: 1) embodiments may generally use the centralized approach (SDN) 574, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 574, but may also be considered a hybrid approach.

While FIG. 5D illustrates the simple case where each of the NDs 500A-H implements a single NE 570A-H, it should be understood that the network control approaches described with reference to FIG. 5D also work for networks where one or more of the NDs 500A-H implement multiple VNEs (e.g., VNEs 530A-R, VNEs 560A-R, those in the hybrid network device 506). Alternatively or in addition, the network controller 578 may also emulate the implementation of multiple VNEs in a single ND. Specifically, instead of (or in addition to) implementing multiple VNEs in a single ND, the network controller 578 may present the implementation of a VNE/NE in a single ND as multiple VNEs in the virtual networks 592 (all in the same one of the virtual network(s) 592, each in different ones of the virtual network(s) 592, or some combination). For example, the network controller 578 may cause an ND to implement a single VNE (a NE) in the underlay network, and then logically divide up the resources of that NE within the centralized control plane 576 to present different VNEs in the virtual network(s) 592 (where these different VNEs in the overlay networks are sharing the resources of the single VNE/NE implementation on the ND in the underlay network).

Figure 5E:
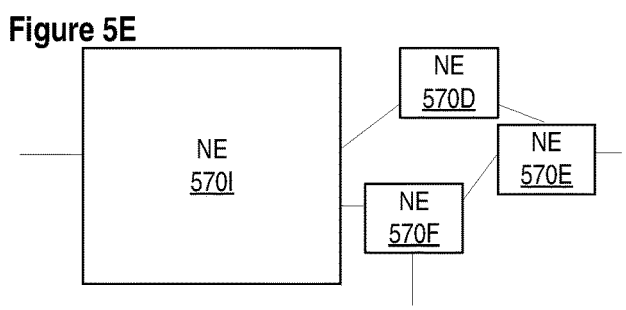
FIG. 5E illustrates the simple case of where each of the NDs implements a single NE, but a centralized control plane has abstracted multiple of the NEs in different NDs into (to represent) a single NE in one of the virtual network(s), according to some embodiments.
Figure 5F:
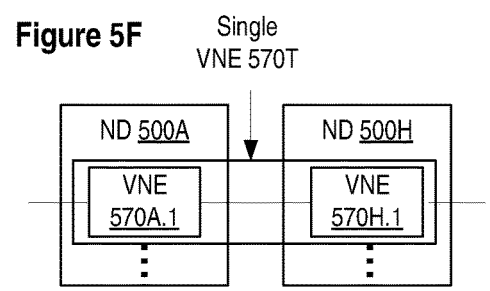
FIG. 5F illustrates a case where multiple VNEs are implemented on different NDs and are coupled to each other, and where a centralized control plane has abstracted these multiple VNEs such that they appear as a single VNE within one of the virtual networks, according to some embodiments.

On the other hand, FIGS. 5E and 5F respectively illustrate exemplary abstractions of NEs and VNEs that the network controller 578 may present as part of different ones of the virtual networks 592. FIG. 5E illustrates the simple case of where each of the NDs 500A-H implements a single NE 570A-H (see FIG. 5D), but the centralized control plane 576 has abstracted multiple of the NEs in different NDs (the NEs 570A-C and G-H) into (to represent) a single NE 5701 in one of the virtual network(s) 592 of FIG. 5D, according to some embodiments of the invention. FIG. 5E shows that in this virtual network, the NE 5701 is coupled to NE 570D and 570F, which are both still coupled to NE 570E.

FIG. 5F illustrates a case where multiple VNEs (VNE 570A.1 and VNE 570H.1) are implemented on different NDs (ND 500A and ND 500H) and are coupled to each other, and where the centralized control plane 576 has abstracted these multiple VNEs such that they appear as a single VNE 570T within one of the virtual networks 592 of FIG. 5D, according to some embodiments of the invention. Thus, the abstraction of a NE or VNE can span multiple NDs.

While some embodiments of the invention implement the centralized control plane 576 as a single entity (e.g., a single instance of software running on a single electronic device), alternative embodiments may spread the functionality across multiple entities for redundancy and/or scalability purposes (e.g., multiple instances of software running on different electronic devices).

Figure 6:
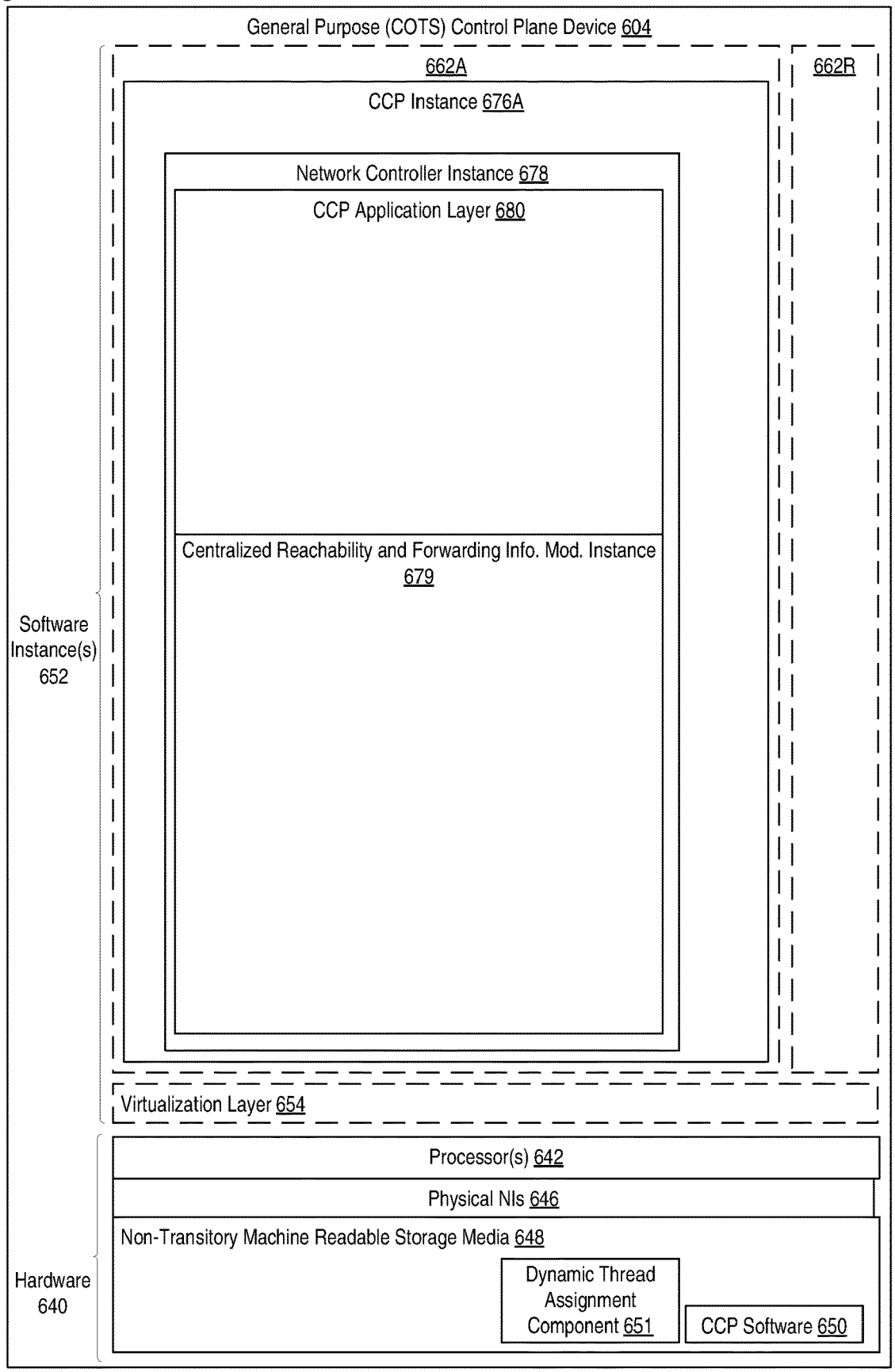
FIG. 6 illustrates a general purpose control plane device with centralized control plane (CCP) software 650, according to some embodiments.

Similar to the network device implementations, the electronic device(s) running the centralized control plane 576, and thus the network controller 578 including the centralized reachability and forwarding information module 579, may be implemented a variety of ways (e.g., a special purpose device, a general-purpose (e.g., COTS) device, or hybrid device). These electronic device(s) would similarly include processor(s), a set or one or more physical NIs, and a non-transitory machine-readable storage medium having stored thereon the centralized control plane software. For instance, FIG. 6 illustrates, a general purpose control plane device 604 including hardware 640 comprising a set of one or more processor(s) 642 (which are often COTS processors) and physical NIs 646, as well as non-transitory machine readable storage media 648 having stored therein centralized control plane (CCP) software 650 and a dynamic thread assignment component 651.

In embodiments that use compute virtualization, the processor(s) 642 typically execute software to instantiate a virtualization layer 654 (e.g., in one embodiment the virtualization layer 654 represents the kernel of an operating system (or a shim executing on a base operating system) that allows for the creation of multiple instances 662A-R called software containers (representing separate user spaces and also called virtualization engines, virtual private servers, or jails) that may each be used to execute a set of one or more applications; in another embodiment the virtualization layer 654 represents a hypervisor (sometimes referred to as a virtual machine monitor (VMM)) or a hypervisor executing on top of a host operating system, and an application is run on top of a guest operating system within an instance 662A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 640, directly on a hypervisor represented by virtualization layer 654 (in which case the unikernel is sometimes described as running within a LibOS virtual machine), or in a software container represented by one of instances 662A-R). Again, in embodiments where compute virtualization is used, during operation an instance of the CCP software 650 (illustrated as CCP instance 676A) is executed (e.g., within the instance 662A) on the virtualization layer 654. In embodiments where compute virtualization is not used, the CCP instance 676A is executed, as a unikernel or on top of a host operating system, on the "bare metal" general purpose control plane device 604. The instantiation of the CCP instance 676A, as well as the virtualization layer 654 and instances 662A-R if implemented, are collectively referred to as software instance(s) 652.

In some embodiments, the CCP instance 676A includes a network controller instance 678. The network controller instance 678 includes a centralized reachability and forwarding information module instance 679 (which is a middleware layer providing the context of the network controller 578 to the operating system and communicating with the various NEs), and an CCP application layer 680 (sometimes referred to as an application layer) over the middleware layer (providing the intelligence required for various network operations such as protocols, network situational awareness, and user-interfaces). At a more abstract level, this CCP application layer 680 within the centralized control plane 576 works with virtual network view(s) (logical view(s) of the network) and the middleware layer provides the conversion from the virtual networks to the physical view.

The dynamic thread assignment component 651 can be executed by hardware 640 to perform operations of one or more embodiments described herein above as part of software instances 652 (e.g., to orchestrate execution of polling threads on a heterogeneous multicore processor as described herein).

The centralized control plane 576 transmits relevant messages to the data plane 580 based on CCP application layer 680 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 580 may receive different messages, and thus different forwarding information. The data plane 580 processes these messages and programs the appropriate flow information and corresponding actions in the forwarding tables (sometimes referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 580, the packet (or a subset of the packet header and content) is typically forwarded to the centralized control plane 576. The centralized control plane 576 will then program forwarding table entries into the data plane 580 to accommodate packets belonging to the flow of the unknown packet. Once a specific forwarding table entry has been programmed into the data plane 580 by the centralized control plane 576, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments are not described with reference to any particular programming language. It will be appreciated that a variety of programming languages may be used to implement the teachings of embodiments as described herein.

An embodiment may be an article of manufacture in which a non-transitory machine-readable (e.g., computer-readable) medium (such as microelectronic memory) has stored thereon instructions (e.g., computer code) which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

Throughout the description, embodiments have been presented through flow diagrams. It will be appreciated that the order of transactions and transactions described in these flow diagrams are only intended for illustrative purposes and not intended as being limiting.

In the foregoing specification, embodiments have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method implemented by a network device for orchestrating execution of a polling thread of a software-based switching program on a heterogeneous multicore processor, wherein the heterogeneous multicore processor includes a plurality of clusters of processing cores, wherein processing cores in the same cluster of the plurality of clusters have the same processing capacity, and wherein processing cores in different clusters of the plurality of clusters have different processing capacities, the method comprising:

causing the polling thread to be executed on a first processing core in a first cluster of the plurality of clusters;

determining a value indicative of a number of active processing cycles used by the polling thread, wherein the active processing cycles used by the polling thread include processing cycles during which the polling thread is reading packets from an input queue, processing packets for forwarding, and placing packets into an output queue;

determining whether the value is greater than a high threshold associated with the first processing core or lower than a low threshold associated with the first processing core; and causing the polling thread to be moved to a second processing core in a second cluster of the plurality of clusters in response to a determination that the value is greater than the high threshold associated with the first processing core or lower than the low threshold associated with the first processing core, wherein the second processing core has a processing capacity that is higher or lower than the first processing core.

2. The method of claim 1, further comprising:
selecting the second processing core to be a processing core having a higher processing capacity than the first processing core in response to the determination that the value is greater than the high threshold associated with the first processing core.

3. The method of claim 2, wherein the second processing core is associated with a low threshold, wherein the low threshold associated with the second processing core is lower than the high threshold associated with the first processing core.

4. The method of claim 1, further comprising:
selecting the second processing core to be a processing core having a lower processing capacity than the first processing core in response to the determination that the value is lower than the low threshold associated with the first processing core.

5. The method of claim 4, wherein the second processing core is associated with a high threshold, wherein the high threshold associated with the second processing core is greater than the low threshold associated with the first processing core.

6. The method of claim 1, wherein the value is determined to be an average number of active processing cycles used by the polling thread per second over a given duration.

7. The method of claim 1, wherein the value is determined to be a cumulative average of a number of active processing cycles used by the polling thread over a plurality of intervals.

8. The method of claim 1, where the value is determined to be an average number of active processing cycles used by the polling thread to process a predefined number of packets.

9. The method of claim 1, further comprising:
keeping the polling thread on the first processing core in response to a determination that the value is between the low threshold associated with the first processing core and the high threshold associated with the first processing core.

10. The method of claim 1, further comprising:
configuring the low threshold associated with the first processing core or the high threshold associated with the first processing core to be a percentage of a processing capacity of the first processing core.

11. A network device for orchestrating execution of a polling thread of a software-based switching program on a heterogeneous multicore processor, wherein the heterogeneous multicore processor includes a plurality of clusters of processing cores, wherein processing cores in the same cluster of the plurality of clusters have the same processing capacity, and wherein processing cores in different clusters of the plurality of clusters have different processing capacities, the network device comprising:
a set of one or more processors; and a non-transitory computer-readable storage medium storing instructions, which when executed by the set of one or more processors, causes the network device to:
cause the polling thread to be executed on a first processing core in a first cluster of the plurality of clusters,
determine a value indicative of a number of active processing cycles used by the polling thread, wherein the active processing cycles used by the polling thread include processing cycles during which the polling thread is reading packets from an input queue, processing packets for forwarding, and placing packets into an output queue,
determine whether the value is greater than a high threshold associated with the first processing core or lower than a low threshold associated with the first processing core, and
cause the polling thread to be moved to a second processing core in a second cluster of the plurality of clusters in response to a determination that the value is greater than the high threshold associated with the first processing core or lower than the low threshold associated with the first processing core, wherein the second processing core has a processing capacity that is higher or lower than the first processing core.

12. The network device of claim 11, wherein the instructions, when executed by the set of one or more processors, further causes the network device to:
select the second processing core to be a processing core having a higher processing capacity than the first processing core in response to the determination that the value is greater than the high threshold associated with the first processing core.

13. The network device of claim 11, wherein the instructions, when executed by the set of one or more processors, further causes the network device to:
select the second processing core to be a processing core having a lower processing capacity than the first processing core in response to the determination that the value is lower than the low threshold.

14. The network device of claim 11, wherein the active processing cycles used by the polling thread include processing cycles during which the polling thread is reading packets from an input queue, processing packets for forwarding, and placing packets into an output queue but does not include processing cycles during which the polling thread is polling for packets to process from an empty input queue.

15. A non-transitory computer-readable storage medium storing instructions, which when executed by one or more processors of a network device, causes the network device to perform operations for orchestrating execution of a polling thread of a software-based switching program on a heterogeneous multicore processor, wherein the heterogeneous multicore processor includes a plurality of clusters of processing cores, wherein processing cores in the same cluster of the plurality of clusters have the same processing capacity, and wherein processing cores in different clusters of the plurality of clusters have different processing capacities, the operations comprising:
causing the polling thread to be executed on a first processing core in a first cluster of the plurality of clusters;
determining a value indicative of a number of active processing cycles used by the polling thread, wherein the active processing cycles used by the polling thread include processing cycles during which the polling thread is reading packets from an input queue, processing packets for forwarding, and placing packets into an output queue;
determining whether the value is greater than a high threshold associated with the first processing core or lower than a low threshold associated with the first processing core; and
causing the polling thread to be moved to a second processing core in a second cluster of the plurality of clusters in response to a determination that the value is greater than the high threshold associated with the first processing core or lower than the low threshold associated with the first processing core, wherein the second processing core has a processing capacity that is higher or lower than the first processing core.

16. The non-transitory computer-readable storage medium of claim 15, wherein the instructions, when executed by the one or more processors, causes the network device to perform further operations comprising:
selecting the second processing core to be a processing core having a higher processing capacity than the first processing core in response to the determination that the value is greater than the high threshold associated with the first processing core.

17. The non-transitory computer-readable storage medium of claim 15, wherein the instructions, when executed by the one or more processors, causes the network device to perform further operations comprising:
selecting the second processing core to be a processing core having a lower processing capacity than the first processing core in response to the determination that the value is lower than the low threshold.

18. The non-transitory computer-readable storage medium of claim 15, wherein the instructions, when executed by the one or more processors, causes the network device to perform further operations comprising:
keeping the polling thread on the first processing core in response to a determination that the value is between the low threshold associated with the first processing core and the high threshold associated with the first processing core.

* * * * *